United States Patent [19]

Azegami et al.

[11] Patent Number: 5,408,285
[45] Date of Patent: Apr. 18, 1995

[54] ADJUSTING MECHANISM OF A LENS BARREL

[75] Inventors: Kazuyoshi Azegami; Hiroshi Nomura, both of Tokyo, Japan

[73] Assignee: Asahi Kogaku Kogyo Kabushiki Kaisha, Tokyo, Japan

[21] Appl. No.: 170,413

[22] Filed: Dec. 20, 1993

[30] Foreign Application Priority Data

Dec. 25, 1992 [JP] Japan .................... 4-089033 U

[51] Int. Cl.⁶ .............................................. G03B 17/04
[52] U.S. Cl. ................................... 354/187; 354/195.1
[58] Field of Search ..................... 354/187, 191, 195.1, 354/195.12

[56] References Cited

U.S. PATENT DOCUMENTS 3,672,280 6/1972 Imura ................................. 354/187
4,873,542 10/1989 Nakayama ...................... 354/195.1

*Primary Examiner*—David M. Gray
*Attorney, Agent, or Firm*—Kane, Dalsimer, Sullivan, Kurucz, Levy, Eisele and Richard

[57] ABSTRACT

An adjusting mechanism of a lens barrel of a camera, including a lens supporting member which supports a photographing optical system, a camera body which supports the lens supporting member in a movable fashion in an optical axis direction of the photographing optical system, and a spring member for biasing the lens supporting member forwardly in the optical axis direction. The mechanism further includes a connecting member which restricts a movement of the lens supporting member to a maximum projecting position against a restoring force of the spring member in the optical axis direction with respect to the camera body while permitting the lens supporting member to move rearwardly against the restoring force of the spring member in the optical axis direction.

9 Claims, 3 Drawing Sheets

ADJUSTING MECHANISM OF A LENS BARREL

BACKGROUND OF THE INVENTION

1. Field of the Invention

The present invention is directed to a mechanism of a lens barrel for adjusting a back focus. The adjusting mechanism also protects the lens barrel from being damaged upon impact or upon an excessive load being applied to the lens barrel.

2. Description of Related Art

A lens barrel of a camera is usually fixed to an associated camera body by, for example, a threaded-engagement. In the camera shown in FIG. 3, a lens barrel 51 is connected to a camera body 53 by a female threaded portion 54, which is formed on the inner peripheral surface of a stationary barrel 55 of the camera body 53, and a male threaded portion 56, which is formed on the outer peripheral surface of the lens barrel 51 and is engaged with the female threaded portion 54. In the camera, a back focus (i.e., back focal distance) is adjusted by rotating the lens barrel 51 with respect to the stationary barrel 55, i.e., the camera body 53, to move the lens barrel 51 in tile optical axis direction of the lens barrel 51. After a back focus adjustment is completed, the lens barrel 51 is immovably fixed to the camera body 53 so that the lens barrel 51 will not rotate with respect to the camera body 53, thereby maintaining the back focus adjustment. With this arrangement, however, if the camera 50 is dropped and the lens barrel impacts with the ground, the lens barrel 51 and/or associated members around the lens barrel 51 may be damaged or broken since the impact or load on the lens barrel 51 is not absorbed due to the fixed arrangement of the lens barrel 51 and the camera body 53.

SUMMARY OF THE INVENTION

The primary object of the present invention is to provide an adjusting mechanism of a lens barrel for adjusting a back focus that can also protect the lens barrel from being damaged by impact or an excessive load which is accidentally applied to the lens barrel.

To achieve the object mentioned above, according to the present invention, an adjusting mechanism of a lens barrel of a camera is provided, including a lens supporting member which supports a photographing optical system, a camera body which supports the lens supporting member in a movable fashion in an optical axis direction of the photographing optical system with respect to the camera body, and a spring member for biasing the lens supporting member forwardly in the optical axis direction. The adjusting mechanism further includes a connecting mechanism which restricts a movement of the lens supporting member to a maximum projecting position against a restoring force of the spring member in the optical axis direction with respect to the camera body while permitting the lens supporting member to move rearwardly against the restoring force of the spring member in the optical axis direction.

With this arrangement, since the lens supporting member is supported in a manner such that the lens supporting member is movable rearwardly in the optical axis direction against a restoring force of the spring means, even if an impact or load is applied to the lens barrel, e.g., if the camera is dropped and the lens impacts with the ground, the lens supporting member retreats against the restoring force of the spring. In other words, the spring absorbs the impact. Therefore, damage to the lens barrel and/or associated members around the lens barrel due to the impact can be prevented.

The present disclosure relates to subject matter contained in Japanese Utility Model Application No. 4-89033 (filed on Dec. 25, 1992) which is expressly incorporated herein by reference in its entirety.

BRIEF DESCRIPTION OF THE DRAWINGS

The invention will be described below in detail with reference to the accompanying drawings, in which.

DESCRIPTION OF THE PREFERRED EMBODIMENTS

Figure 1:
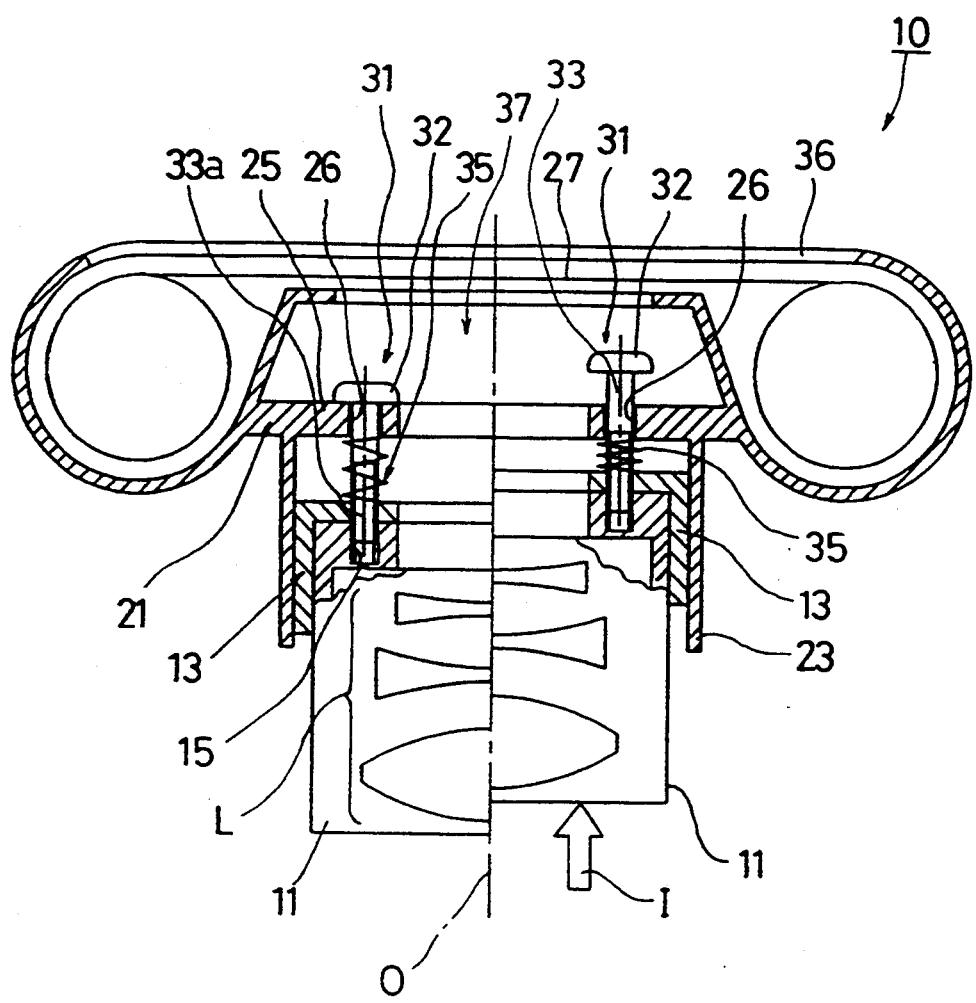
FIG. 1 is a sectional view of a camera to which the present invention is applied, showing a main portion of the camera which is related to the present invention.
Figure 2:
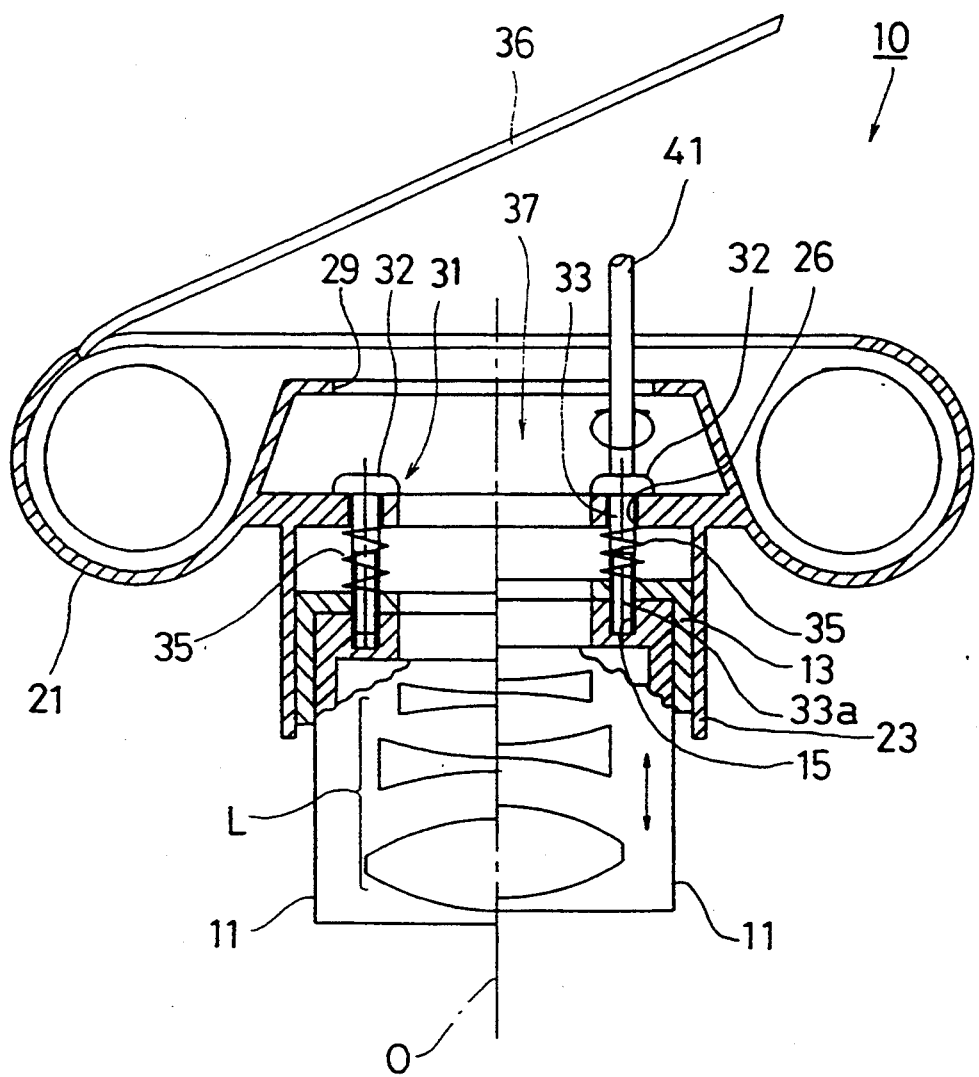
FIG. 2 is a sectional view of the camera shown in FIG. 1, showing a back focus adjusting state of the camera; and, FIG. 3 is a sectional view of a camera of prior art, showing a portion of the camera similar to that of FIG. 1.
Figure 3:
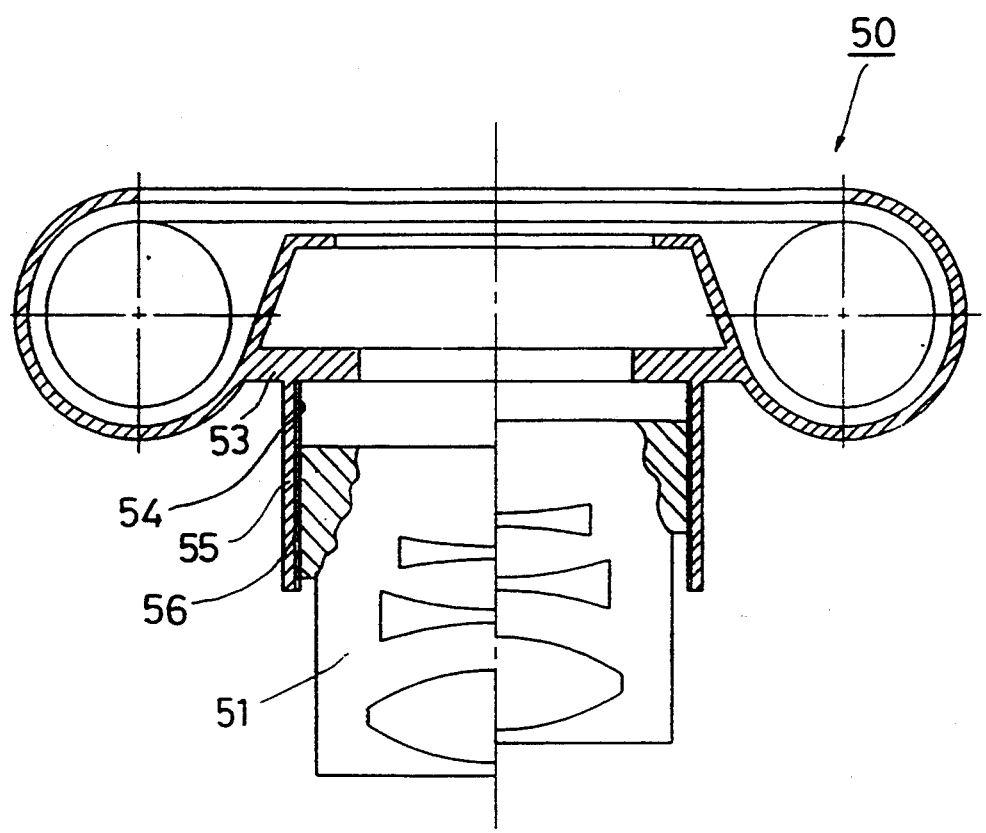

FIGS. 1 and 2 show main portions of a camera 10 to which the present invention is applied. In FIGS. 1 and 2, different states are shown at right and left sides of an optical axis O.

The camera 10 includes a camera body 21 to which a lens barrel (i.e., lens supporting member) 11 is fixed. The lens barrel 11 supports therein a photographing lens group L. A slidable guide barrel 13 is fixed to the rear of the lens barrel 11. The slidable guide barrel 13 is engaged with a stationary barrel 23 formed on the camera body 21 with the outer peripheral surface of the slidable guide barrel 13 contacting the inner peripheral surface of the stationary barrel 23 in a slidable manner in the optical axis direction O.

The lens barrel 11 is connected to the camera body 21 by a plurality of adjusting screws (i.e., connecting means) 31. Each of the plurality of adjusting screws 31 includes a head 32 and a shaft 33. A threaded portion 33a is formed on a predetermined portion of the shaft 33. The camera body 21 includes a supporting plate 25 which is positioned at the rear end of the stationary barrel 23. The supporting plate 25 is integral with the stationary barrel 23 and perpendicular to the optical axis O. A plurality of holes 26 are formed in the supporting plate 25. The number of holes 26 corresponds to the number of adjusting screws 31. The threaded portions 33a are engaged with corresponding female threaded holes 15 formed in the rear of the lens barrel 11 with the shaft 33 passing through the corresponding holes 26 from a side of a film 27 to the object side. A coil spring 35 is provided on each of the plurality of adjusting screws 31 between the rear end of the slidable guide barrel 13 and the supporting plate 25. The coil springs 35 press against the slidable guide barrel 13 and the camera body 21 in opposite directions in the optical axis direction O, respectively. In other words, the coil springs 35 bias the slidable guide barrel 13 forwardly in the optical axis O. A predetermined space 37 is formed between the supporting plate 25 and the film 27. The predetermined space 37 allows the heads 32 of the plurality of screws 31 to move rearwardly in the predetermined space 37. Accordingly, in a normal state, the lens barrel 11 is elastically supported with the heads 32 contacting the rear surface of the supporting plate 25 in such a manner that the lens barrel 11 can move rearwardly (i.e., towards the film 27) in the optical axis direction O against the restoring force of the coil springs 35.

If an impact or an excessive load (shown by "I" in FIG. 1) is applied to the lens barrel 11 in the optical axis direction O, the lens barrel 11 moves rearwardly, i.e, towards the camera body 10, due to the impact, as shown in FIG. 1 on the right side of the optical axis O. Therefore, even if an impact is applied to the lens barrel 11, it is possible to prevent the lens barrel 11 and associated members, such as the slidable guide barrel 13 and the stationary barrel 23, from being damaged since the impact is absorbed by coil springs 35.

FIG. 2 shows a back focus adjusting state of the camera 10. A back focus adjustment is carried out in the absence of film with the back cover 36 open. In the state of the camera, in which the back cover 36 is kept opened, an adjusting driver 41 is inserted in the camera body 21 engaged with the heads 32 to rotate and adjust the same. Since the positions of the threaded portions 33a in the optical axis direction O with respect to the female threaded holes 15 are varied by the rotation of the plurality of screws 31, the lens barrel 11 is moved in the optical axis direction O while contact between the heads 32 and the supporting plate 25 is maintained by the restoring force of the coil springs 35. As a result, a back focus is adjusted.

As can be seen from the foregoing, according to the present invention, since the lens barrel 11 is supported in a manner such that the heads 32 of the plurality of screws 31 are biased against the supporting plate 25 by the restoring force of the coil springs 35, and since the lens barrel 11 can retract against the restoring force of the coil springs 35, even if an impact or load is applied to the lens barrel 11, the lens barrel 11 will retract by compressing the coil springs 35 and subsequently recover its original position. Therefore, the connecting portions between the lens barrel 11 and the camera body 21 will not be damaged or broken.

In the case that the slidable guide barrel 13 is fitted in the stationary barrel 23 in a slidable manner, with substantially no play therebetween, it is possible to provide only one screw 31 together with the corresponding hole 26, coil spring 35, and female threaded hole 15. With this arrangement, in which only one screw 31 is necessary, a back focus adjustment can be easily made, since it is no longer necessary to adjust the inclination of the optical axis O with respect to the camera body 21.

Although the invention has been described with reference to particular means, materials and embodiments, it is to be understood that the invention is not limited to the particulars disclosed and extends to all equivalents within the scope of the claims.

We claim:

1. An adjusting mechanism of a lens barrel of a camera, comprising:
   a lens supporting means which supports a photographing optical system;
   a camera body which supports said lens supporting means in a movable fashion in an optical axis direction of said photographing optical system;
   a spring means for applying a forwardly biasing force on said lens supporting means in the optical axis direction and to absorb forces applied to said lens supporting means;
   a connecting rod secured to said lens supporting means and slidably connected to said camera body to restrict movement of said lens supporting means in said optical axis direction to a maximum forwardly projecting position with respect to said camera body, while permitting said lens supporting means to move rearwardly against said spring means biasing force; and
   means provided on said connecting rod for adjusting said maximum forwardly projecting position of said lens supporting means.

2. The adjusting mechanism of claim 1, further comprising a stationary barrel which is formed on said camera body, wherein said lens supporting means is slidably fitted in said stationary barrel.

3. The adjusting mechanism of claim 2, wherein said camera body includes a supporting means which is positioned at a rear end of said stationary barrel.

4. The adjusting mechanism of claim 3, wherein said connecting rod is a screw having a head and a shaft on which a threaded portion is formed.

5. The adjusting mechanism of claim 4, wherein said supporting means includes a hole, said lens supporting means has a female threaded hole, said screw shaft slidably passes through said supporting means hole and said threaded portion engages with said female threaded hole.

6. The adjusting mechanism of claim 5, wherein said spring means is a coil spring, said coil spring being disposed about said shaft between said supporting means and said lens supporting means.

7. The adjusting mechanism of claim 2, wherein said lens supporting means includes a lens barrel which supports said photographing optical system and a slidable member which is fixed to said lens supporting means and is slidably fitted in said stationary barrel.

8. An adjusting mechanism of a lens barrel of a camera, comprising:
   a lens supporting barrel which supports a photographing optical system;
   a camera body having a stationary barrel in which said lens supporting barrel is slidable in an optical axis direction of said photographing optical system with respect to said camera body;
   a spring means for biasing said lens supporting barrel forwardly in said optical axis direction; and,
   a connecting rod which connects said lens supporting barrel to said camera body in a manner such that a position of said lens supporting barrel in said optical axis direction is adjustable with respect to said camera body, wherein said connecting rod restricts a movement of said lens supporting barrel to a maximum projecting position against a restoring force of said spring means in said optical axis direction with respect to said camera body while permitting a rearward movement of said lens supporting barrel against said restoring force of said spring means in said optical axis direction.

9. An adjusting mechanism of a lens barrel of a camera, comprising:
   a lens supporting barrel for supporting a photographing optical system having a plurality of lens groups;
   a camera body which slidably supports said lens supporting barrel in an optical axis direction of said photographing optical system, wherein a relative position of said plurality of lens groups is maintained during movement of said lens supporting barrel;
   a spring means for biasing said lens supporting barrel forwardly in said optical axis direction; and,
   means for adjusting a position of said lens supporting barrel in said optical axis direction against a restoring force of said spring means while permitting movement of said lens supporting barrel in a direction in which said spring means is compressed.

* * * * *